Figure 1:
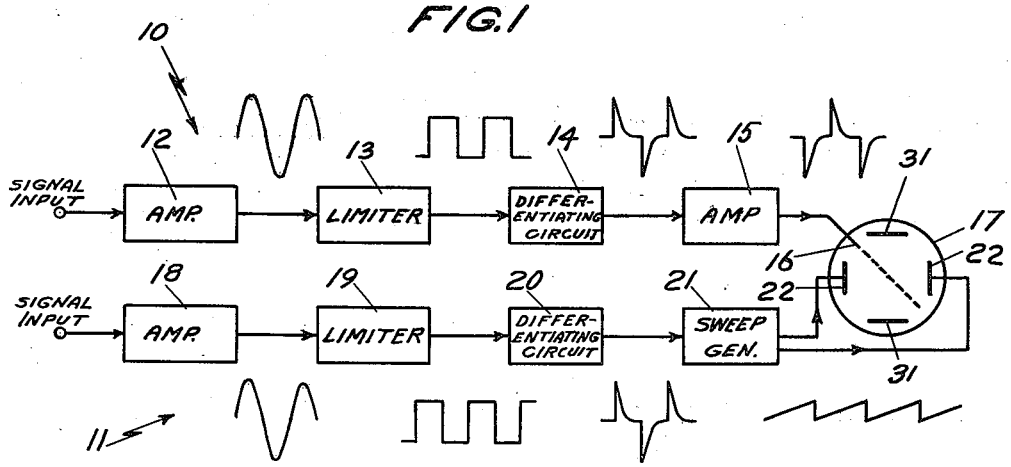

Feb. 19, 1963  P. D. FRELICH  3,078,415
PHASE MEASURING DEVICES
Filed June 29, 1949  2 Sheets-Sheet 1

INVENTOR
PAUL D. FRELICH
BY Elmer J. Gorn
ATTORNEY

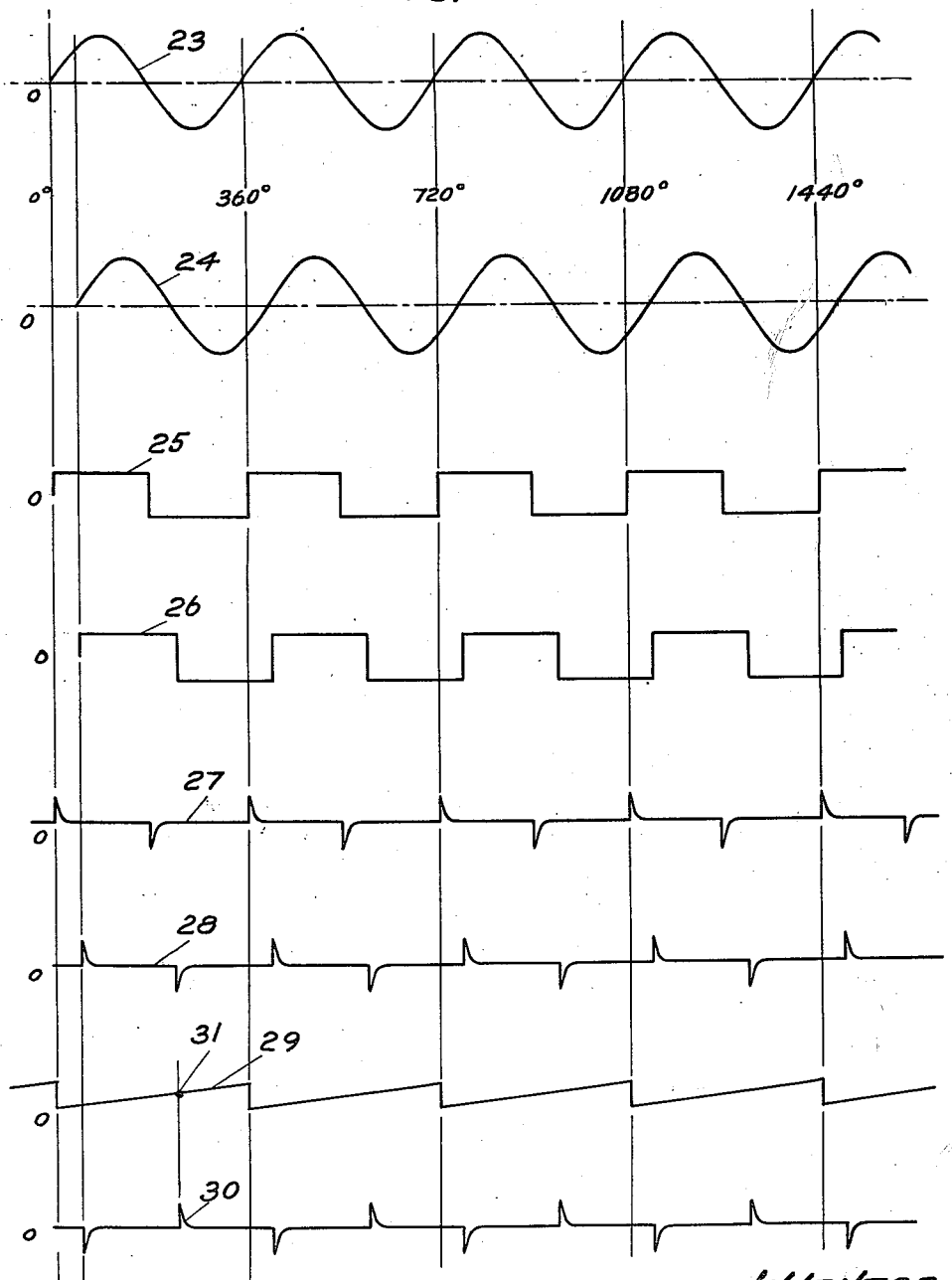

3,078,415
Patented Feb. 19, 1963

3,078,415
PHASE MEASURING DEVICES
Paul D. Frelich, Waltham, Mass., assignor to Raytheon Company, Lexington, Mass., a corporation of Delaware
Filed June 29, 1949, Ser. No. 101,929
6 Claims. (Cl. 324—88)

This application relates to electron discharge systems and more particularly to a system for determining the phase difference between a plurality of electrical signals of the same frequency.

In underwater sound equipment utilizing a sound transducer for transmitting and receiving echoes it is important to be able to accurately ascertain the direction from which echoes are received. One manner of accomplishing this is to position two sections of a sound transducer such that an incoming echo strikes both sections at approximately the same time. If the echo does not strike both sections at the same time, there will be a phase difference between the electrical signals induced in the transducers by the echo. This phase difference will be proportional to the deviation of the direction of the echo from a fixed reference, for example, a perpendicular to the receiving surfaces of the transducer sections.

Heretofore, phase comparison devices used for this purpose required complex systems for modulating the incoming signals and comparing phase differences in components of the modulated wave. Applicant's invention provides for utilizing signals as received and directly comparing them. This system in general comprises amplifying each received signal in a separate channel, clipping the tops of the sinusoidal wave forms of the received signal, differentiating the squared waves to form pips, using the pips from one signal to trigger a sweep generator which may, for example, produce a saw-tooth wave form which is applied to the deflection system of a cathode ray tube, for example, the horizontal deflection plates thereof thereby producing a horizontal sweep, and using the pips from another signal to grid modulate the cathode ray tube by applying said pips directly to the grid whereby bright spots appear along the line produced by the sweep controlled by the first signal. As the phase difference between these two signals changes, the bright spots will move along the line on the cathode ray tube.

Since this system requires no detectors, it is substantially instantaneously responsive to input signals in the form of pulses such as those produced by echoes. Furthermore, since each signal is amplified in its separate channel, these channels may be designed identically and tuned to precisely the same frequency such that they will both have the same phase shift characteristics both for signal amplitude and for variations in frequency of the received signal. Thus these effects compensate for each other and produce no output error in the phase measurement such as would be produced if one amplifier had a phase shift characteristic which varied with frequency and amplitude differently from the other amplifier. Also, since the incoming signals are clipped by a limiter, the system is substantially insensitive to amplitude variations of incoming signals.

Applicant has also produced a device whereby each signal amplifier operates as a superheterodyne receiver whereby the input signal is beat with a local oscillator to produce an intermediate frequency, said intermediate frequency being amplified in a fixed tuned amplifier while the local oscillator and input circuits may be tunable over a wide range of frequencies whereby echoes of any desired frequency may be received. Since the same local oscillator beats with both input signals, the intermediate frequency produced in the two channels will be equal and the intermediate signals will have a phase difference the same as the input signals to the system.

Figure 2:
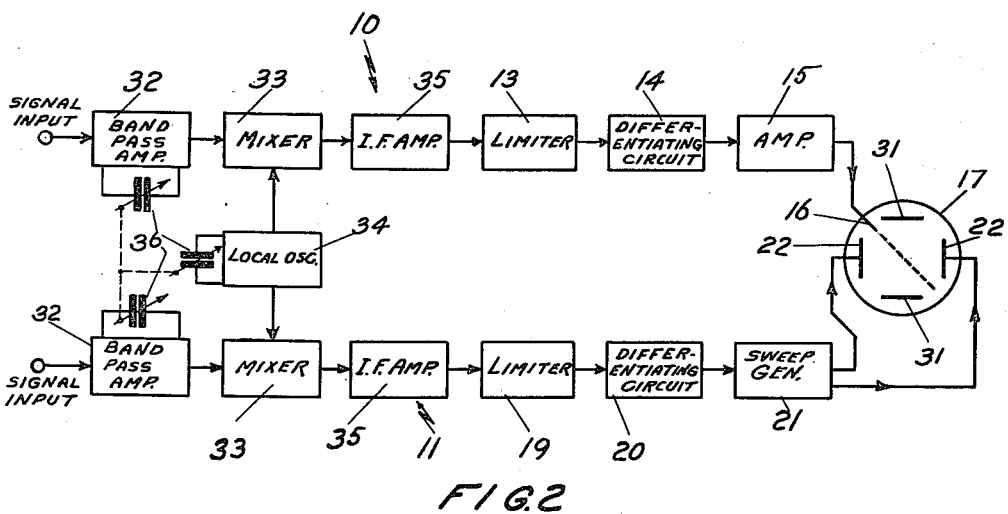

The particular details of the system will now be more completely described, reference being had to the accompanying drawings wherein:

FIG. 1 represents a block diagram of a modification of the invention wherein the input signals are compared directly;

FIG. 2 represents a block diagram of a modification of the invention wherein the signals are first amplified by superheterodyne action and then compared in the same manner as that of FIG. 1; and FIG. 3 represents an illustration of various wave forms throughout the system illustrating the phase relation therebetween for an illustrative example of a phase differential in two signals which is representative of one direction of a received echo.

Referring now to FIG. 1, there is shown a phase comparison device comprising two signal translation channels 10 and 11. Signal channel 10 comprises an amplifier 12 whose input may be connected to any desired signal source such as the aforementioned sound transducer. The signal being amplified in amplifier 12 is substantially a sine wave, amplifier 12 being tuned to the frequency of said signal and having sufficient band pass to follow the modulated envelope of the signal.

The sinusoidal wave form is then fed to a limiter circuit 13 which clips the tops of the sine wave to form a square wave. Limiter 13 may be any of a number of well-known limiting circuits such as, for example, an amplifier whose grid is driven both into cut-off and into the positive grid potential region whereby grid current limits the amplitude of the output, or a pair of diodes connected across the circuit in opposition whereby one diode conducts to limit the signal for a positive swing of the sine wave and the other diode conducts on the negative swing of the sine wave. These diodes may be biased such that they would only conduct above a certain voltage, the magnitude of this bias being substantially equal to the amplitude of the square wave output.

The output from limiter 13 is fed through a differentiator 14 which may consist, for example, of a short time constant series resistor condenser circuit, the signal output of the differentiator being taken off across resistor. The output of differentiator circuit 14 will be a series of pips which corresponds to the leading edges of the square wave. The output of differentiator circuit 14 is fed through an amplifier 15 which inverts the phase of the pips such that the negative pips are now positive. The output of amplifier 15 feeds grid 16 of a cathode ray tube 17. The bias of grid 16 is so adjusted that positive pips from amplifier 15 produces spots on the screen of screen 17 while negative pips have no effect.

Signal channel 11 has an amplifier 18, limiter 19 and differentiating circuit 20 identical to those of channel 10, the amplifier 18 being connected to a signal source having the same frequency as that feeding amplifier 12 such as a different section of the sound transducer that feeds amplifier 12. The output of differentiating circuit 20 comprises a plurality of sharp pips corresponding to the leading edges of its input square wave. These pips are fed to a sweep generator 21, which may be of any desired type well known in the art such as a grid control gas tube triggered by the positive pips of differentiator 20. This gas tube upon firing would discharge a condenser across said gas tube and after said gas tube is extinguished the condenser would charge through a resistor connected to a suitable source of potential. The output of sweep generator 21 is a saw-tooth sweep which is fed to the horizontal deflection plates 22 of cathode ray tube 17 thus producing a horizontal linear sweep.

A bright spot will appear on the sweep whenever a positive pip is fed to grid 16 by amplifier 15. If the phase of the signal fed to channel 10 varies with respect to that fed to channel 11, the positive pips produced by amplifier 15 will change with respect to a fixed reference point on the saw-tooth wave and as a result the position of the bright spot produced on screen of tube 17 will vary along the horizontal sweep line, said position varying directly with variations in the phase difference of the input signals to channels 10 and 11.

Referring now to FIG. 3, there is shown an illustrative example of one phase difference between the signals fed to channels 10 and 11. Wave form 23 represents the sinusoidal output of amplifier 18 and wave form 24 represents the sinusoidal ouput of amplifier 12. These wave forms are shown along the same relative time base, said time base being the ordinate of the graph and the amplitude of the waves being the abscissa, as shown here, wave form 24 lags wave form 23 by a certain phase difference, for example, 45°. This phase difference is translated through limiting circuits 13 and 19 respectively, wave form 25 representing the output of limiter 19 and wave form 26 representing the output of limiter 13. As aforementioned, these wave shapes are the result of amplifying and clipping the wave forms 23 and 24. The same phase difference occurs between the pips derived from the differentiating circuits 14 and 20, the wave shape 27 being the output of limiter 20 and the wave shape 28 being the output of limiter 14. As may be seen, the pips of wave form 28 lag those of the wave form 27 the the same amount as wave form 24 lags wave form 23. Positive pips of the wave form 27 which are fed to the sweep generator 21 correspond to the beginnings of the saw-tooth voltage output as shown by wave form 29. The output of amplifier 15 has positive pips which lag the beginning of the wave shape 29 by an amount equal to the phase inversion of amplifier 15 plus the phase difference between the pips of wave forms 27 and 28 or as shown by wave form 30, the positive pips from the amplifier 15 lag the saw-tooth output of sweep generator 21 by 180° plus 45° or 225°. As shown by point 31 this will be about 5/8 of the distance along the saw-tooth wave form 29. Since the relative amplitude of the saw-tooth 25 at any point corresponds to the relative distance the beam has moved from the beginning side of the scope, the point 31 represents the position at which the screen will brighten or approximately 5/8 the distance from one side of the screen to the other. If the signals were inphase, the spot would, therefore, be in the middle of the screen thus representing zero phase differential. If the sweep moves from left to right, when the spot is on the way to the left, the phase shift will be ½ a cycle or 180° and similarly when the spot is all the way to the right, the phase shift will be 180°, signal wave form 24 leading wave form 23 when the spot is to the left of center and lagging wave form 23 when it is to the right of center. Thus it may be seen that the direction from which an echo is received will correspond to a given position on the screen of the cathode ray tube 17.

If desired, a saw-tooth wave form may be put in the vertical plates 31 of tube 17, said saw-tooth being triggered by a pulse of energy transmitted into the water by transducers. The vertical position of the spot would then be a measure of the distance of the target producing echo from the signal sound transducer.

Referring now to FIG. 2, there is shown an amplifier system utilizing a superheterodyne action whereby any desired frequency input signal may be received while retaining the high-gain amplifiers of the system fixed tuned to an I.F. signal frequency. The two channels 10 and 11 each have a band-pass amplifier 32 connected to the source of signals, each band-pass amplifier feeding signals to a separate mixing circuit 33. Both mixing circuits 33 are fed from the same local oscillator 34. The outputs of mixers 33 are fed to I.F. amplifiers 35 both tuned to the same frequency. One of the I.F. amplifiers 35 feeds a limiter 13, a differentiator circuit 14 and an amplifier 15 and the other I.F. amplifier 35 feeds limiter circuit 19, differentiator 20 and sweep generator 21, the outputs from amplifier 15 and 21 being fed to cathode ray tube 17 similar to the manner previously described in connection with FIG. 1.

The amplifiers 32 and oscillator 34 are each tunable by three sections of condenser 36, said sections being ganged together to produce tracking in a well-known manner. The I.F. amplifiers 35 may be tuned, for example, to a center frequency of 60 kilocycles which may be the lower side band of the modulated output of mixers 33. In this case if it were desired, for example, to tune the input band-pass amplifiers 32 over a range of 19–27 kc., the local oscillator would be tracked with the tuning of amplifiers 32 such that it would produce a frequency over a range of 79–87 kc., the resultant lower side bands in all cases being 60 kc. Since the same local oscillator feeds both mixers 33, the modulated outputs of the mixers feeding amplifiers 35 will have the same phase difference as the signals fed into amplifiers 32. The majority of the required gain is produced in amplifiers 35, amplifiers 32 acting mainly for signal and noise rejection purposes. The phase shift in amplifiers 35 will be equal since they are fixed tuned and, therefore, compensate for itself. Any error in tracking between amplifiers 32 will produce negligible error in the relative phase shift between signals passed by said amplifiers since amplifiers 32 are relatively low gain and may have a relatively broad band pass.

This completes the description of the specific embodiments of the invention illustrated herein. However, many modifications thereof will be apparent to persons skilled in the art without departing from the spirit and scope of this invention. For example, the sweep generator could be of the hard tube type fed directly from limiter 19 and the pips could be applied to the vertical deflection plates rather than the intensity control grid if a simple phase measuring device were desired. Therefore, applicant does not wish to be limited to the particular details of the invention as described herein except as defined by the appended claims.

What is claimed is:

1. A device for determining the relative phase between a plurality of signals having the same frequency comprising means for transmitting the flow of energy from one or more transmission systems to at least one other transmission system, a separate signal translation channel connected to each of said transmitting means, and means for comparing the relative phase of the output waves of said channels, comprising a linear output sweep generator synchronized to the output of a first of said channels, and a cathode ray tube having means for deflecting the beam of said tube along one axis of the screen of said tube, said deflecting means being fed by said sweep generator and the output of a second of said channels being fed to said cathode ray tube to modulate said beam.

2. A device for determining the relative phase between a plurality of signals having the same frequency comprising means for transmitting the flow of energy from one or more transmission systems to at least one other transmission system, a separate signal translation channel connected to each of said transmitting means, each of said channels comprising an amplifier, a clipper and a differentiator, and means for comparing the relative phase of the output of said channels comprising a linear output sweep generator synchronized to the output of a first of said channels, a cathode ray indicator having means for deflecting the beam of said indicator along one axis of the screen of said indicator, said deflecting means being fed by said sweep generator, and the output of a second of said channels being fed to said cathode ray indicator to modulate said beam.

3. A device for determining the relative phase between a plurality of signal sources having the same frequency comprising a signal translation channel connected to each of said sources, each of said channels comprising an amplifier and a clipper, and means for indicating the relative phase of the output waves of said channels comprising a cathode ray indicator having means for deflecting the beam of said indicator along one axis of the screen of said indicator, said deflecting means comprising a sweep generator fed by a first of said channels and producing a linear deflection of said beam, and the output of a second of said channels being fed to other means of said cathode ray indicator for modulating said beam.

4. A device for determining the relative phase between a plurality of signal sources having the same frequency comprising a signal translation channel connected to each of said sources, each of said channels comprising a mixer, a local oscillator feeding a modulating signal to each of said mixers, and means for indicating the relative phase of the output waves of said channels comprising a tuned amplifier connected to the output of each of said mixers, a sweep generator synchronized to the output of a first of said channels, a cathode ray indicator having means for deflecting the beam of said indicator along one axis of the screen of said indicator fed by said sweep generator to linearly deflect said beam along said axis, and the output of a second of said channels being fed to other means in said cathode ray indicator for modulating said beam.

5. A device for determining the relative phase between a plurality of signal sources having the same frequency comprising a signal translation channel connected to each of said sources, each of said channels comprising a mixer, a local oscillator feeding a modulating signal to each of said mixers, a tuned amplifier connected to the output of each of said mixers, a linear output sweep generator synchronized to the output of a first of said channels, each of said tuned amplifiers being tuned to the same sideband of the modulated signal output of said mixers and means for indicating the relative phase of the output waves of said channels.

6. A device for determining the relative phase between a plurality of signal sources having the same frequency comprising a signal translation channel connected to each of said sources, each of said channels comprising a mixer, a local oscillator feeding a modulating signal to each of said mixers, and means for comparing the relative phase of the output waves of said channels comprising a tuned amplifier connected to the output of each of said mixers, each of said tuned amplifiers being tuned to the same sideband of the modulated signal output of said mixers, a sweep generator synchronized to the output of a first of said channels, a cathode ray indicator having means for deflecting the beam of said indicator along one axis of the screen of said indicator, said deflecting means being fed by said sweep generator to produce linear deflection of said beam along said axis, and the output of a second of said channels being fed through a limiter and a differentiator to other means in said cathode ray indicator for modulating said beam.

References Cited in the file of this patent
UNITED STATES PATENTS

| | | |
|---|---|---|
| 2,062,906 | Hooven | Dec. 1, 1936 |
| 2,183,746 | Hyland | Dec. 19, 1939 |
| 2,285,038 | Loughlin | June 2, 1942 |
| 2,320,476 | Schrader et al. | June 1, 1943 |
| 2,406,858 | Shepherd et al. | Sept. 3, 1946 |
| 2,422,386 | Anderson | June 17, 1947 |
| 2,423,304 | Fitch | July 1, 1947 |
| 2,455,373 | Lester | Dec. 7, 1948 |
| 2,470,464 | Bowie | May 17, 1949 |
| 2,484,824 | Hansel | Oct. 18, 1949 |
| 2,504,852 | Lewis | Apr. 18, 1950 |
| 2,535,304 | Lindborg | Dec. 26, 1950 |
| 2,546,407 | Rich | Mar. 27, 1951 |
| 2,554,806 | Beagles | May 29, 1951 |
| 2,646,566 | McGuigan | July 21, 1953 |
| 2,703,401 | De Rosa | Mar. 1, 1955 |
| 3,024,441 | Saxton | Mar. 6, 1962 |